March 13, 1962  G. T. UPHUES ETAL  3,024,872
RAILWAY TRUCK BRAKE STRUCTURE
Filed May 11, 1959  2 Sheets-Sheet 2

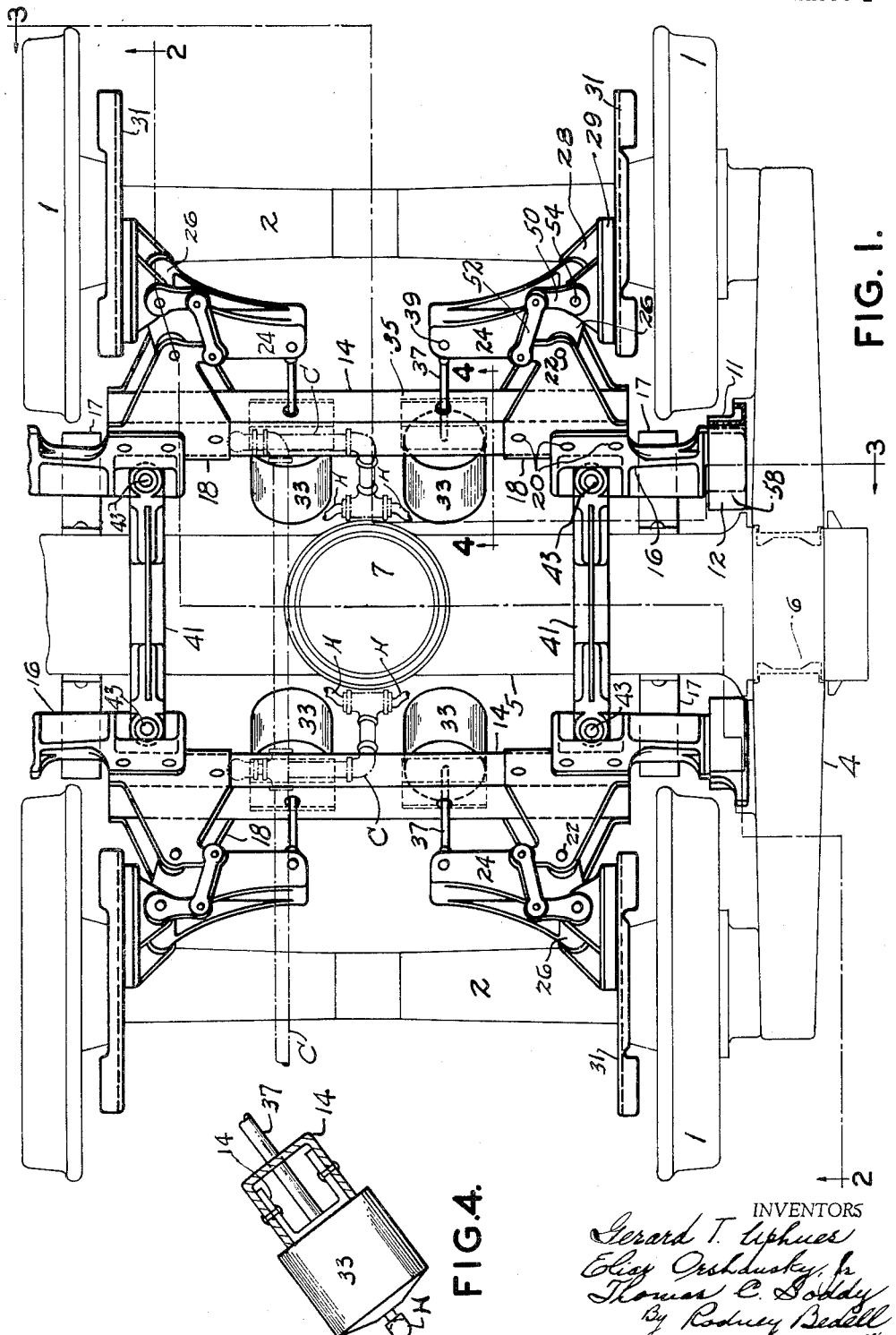

INVENTORS
Gerard T. Uphues
Elias Orshansky, Jr.
Thomas C. Soddy
By Rodney Badell
atty.

3,024,872
RAILWAY TRUCK BRAKE STRUCTURE
Gerard T. Uphues, Chicago, Ill., Elias Orshansky, Jr., New York, N.Y., and Thomas C. Soddy, Downers Grove, Ill., assignors, by mesne assignments, to American Seal-Kap Corporation of Delaware, New York, N.Y., a corporation of Delaware
Filed May 11, 1959, Ser. No. 812,461
13 Claims. (Cl. 188—59)

The invention relates to brake structure for railway rolling stock and consists of a brake gear applicable as a unit to a railway truck and in the assembly therewith.

Brake gear now in use generally comprises power cylinders mounted on the vehicle body and connected to brake beams, movably mounted on the trucks, by a series of pull rods and levers which are anchored to and fulcrummed on the truck frame or, in some instances, the vehicle body. Other brake gears now in use comprise brake cylinders mounted on the truck frames and operatively connected to levers, connecting rods and brake beams.

The main object of the present invention is to utilize a single unit for application to the truck without requiring operating cylinders or other parts mounted on the truck frames or on the vehicle body.

One type of brake gear now in general use includes brake beams extending between and slidably mounted at their ends on opposite truck side frames. These beams are actuated by air brake cylinders and levers and connecting rods mounted, at least in part, on the truck frames or vehicle body. It is a further object of the present invention to adapt a brake gear as indicated in the previous paragraph so that it will be interchangeable with a brake gear as just described or which may be mounted in any truck having side frames equipped with brakes for slidable support of brake beams. Another object of the invention is to avoid any modification of truck side frames, bolsters or other parts from present commonly used forms.

These and other detail objects are attained by the structure illustrated in the accompanying drawings in which:

FIGURE 1 is a top view of a four-wheel truck equipped with novel brake gear embodying the invention.

FIGURE 4 is a detail section on line 4—4 of FIGURE 1.

Figure 3:
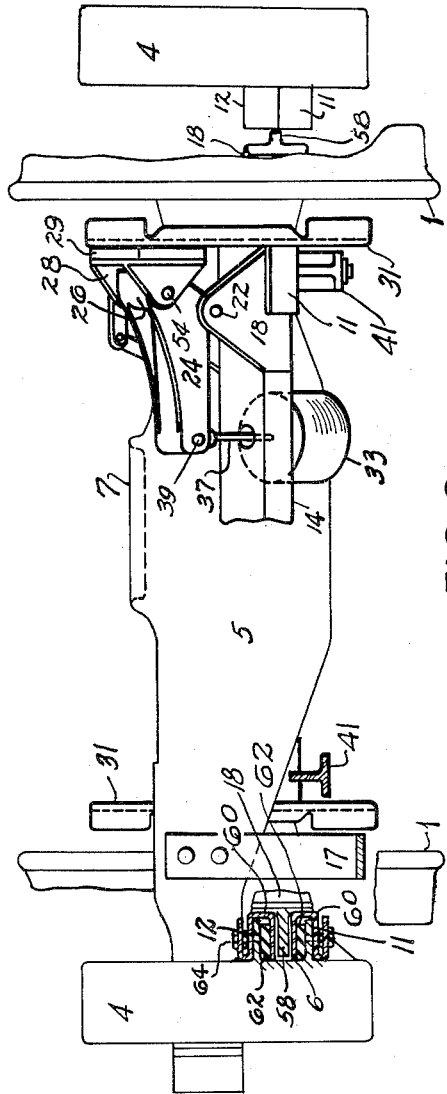
FIGURE 3 is in part an end view and in part a transverse vertical section on line 3—3 of FIGURE 1.
Figure 2:
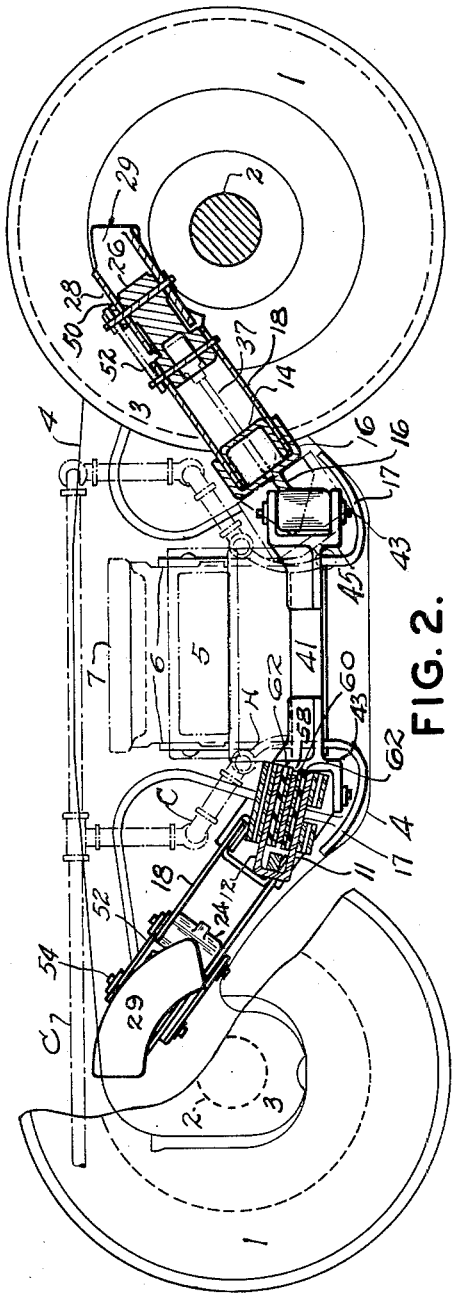
FIGURE 2 is in part a side view and in part a longitudinal vertical section on line 2—2 of FIGURE 1.

The truck is of the type with four wheels 1 on two axles 2 having journal boxes 3 integral with or separate from but held in spaced relation by side frames 4. The load-carrying bolster 5 extends transversely of the truck and its ends are recessed to slidably receive the upright columns 6 of the side frames and thereby hold the side frames in spaced relation. The bolster includes a center plate 7 for supporting a vehicle body (not shown). The side frames include vertically spaced shelves 11, 12 projecting inboard and inclined upwardly and outwardly from their inner ends toward the outer ends of the side frames. Extending transversely of the truck and carried by opposing lower shelves 11 are cross beams which mount the brake mechanism. Each cross beam comprises a main elongated member 14 of channel shaped cross section with extensions 16 normally supported from shelves 11 by rubber mounts described below. Safety stirrups 17 attached to the bolster underlie extensions 16 and prevent the brake gear falling to the rail.

A rigid U-shaped bracket 18 near each end of each cross beam projects toward the adjacent end of the truck. Members 14, 16 and 18 are riveted together at 20. A bell crank has its elbow pivoted at 22 to the outer end of each bracket 18. One arm 24 of each bell crank extends inboard from bracket 18. The other arm 26 of each bell crank extends lengthwise of the truck from bracket 18 and mounts a brake head 28 having a shoe 29, preferably of composition material, opposing a disk 31 affixed to the adjacent portion of axle 2 or to the wheel 1. An individual compressed air cylinder 33 at the inner end of each bracket 18 for each bell crank has a mounting 35 in cross beam member 14. The cylinder includes the usual piston and piston rod 37 projects lengthwise of the truck and is pivotally connected at 39 to the inner end of the corresponding bell crank arm 24. Struts 41 extend between cross beam end members 16 at opposite sides of the bolster and have pivotal connections 43 to end members 16.

An air conduit C leads from the usual triple valve and reservoir (not shown) on the vehicle body to the truck and is connected by individual air hose H to cylinders 33.

From the above description it will be apparent that the admission of air to conduit C will result in advancement of piston rods 37 and the rotation of bell cranks 24, 26 about their fulcrums 22 and the thrust of shoes 29 against the brake disks 31. Each brake head, when its shoe contacts the adjacent disk, forms a stop for the bell crank movement and the resultant thrust is transferred to struts 41 so that the four brakes equalize the pressure exerted by the four cylinders irrespective of variations in tightness of pistons, play in fulcrum or pin joints, lengths of interconnected parts or wear on the brake shoes and disks.

The clevis-like ends 45 of struts 41 resist any tendency of the cross beams to tilt longitudinally of the car because of the overhanging weight of bracket 18, bell cranks 24, 26, brake heads 28, or the torque of the applied brakes. The overhanging weight of the parts mentioned offsets the brake torque resulting from friction between the brake shoes and upwardly moving portions of the brake disks.

Each shoe has a rigid arm 50 extending inboard and pivotally connected at the inner end by a link 52 to bracket 18, thus forming, with bell crank arm 26, a parallelogram linkage which will maintain the shoe parallel to the face of disk 31.

Preferably pivot pins 54 mounting brake heads 28 and pins 22 mounting the brake levers are surrounded by elastic bushings to avoid wear as would occur between metallic elements.

Preferably the tang-like ends 58 of the beam extensions 16 slide along wear plates 60, to which are bonded rubber pads 62. Studs 64 secure these plates and pads to the side frame brackets.

The brake gear eliminates all of the levers usually mounted on the car body or truck frame, and application of the brakes sets up no reactions in the truck frame except that resulting from the friction between the disks and the brake shoes which tends to lower or elevate the cross beams according to the direction of rotation of the wheels. The conventional air cylinder mounted on the vehicle body is eliminated, and the only connection between the air reservoir and the brake gear is through the conduit C.

The brake gear may be mounted on any truck equipped with or adapted for the hangerless type of brake beams in general use but actuated by levers and connection rods mounted on the truck frame and body frame. No modification of the truck side frames or bolster or other truck part is required, nor is it necessary to weld or bolt any brackets to these truck members because of the installation of the brake.

In the event of failure of any cylinder or its connections to a brake lever, or of a brake lever fulcrum pin or connections to the brake shoes, only the individual disk brake would be affected. In most brake systems, the failure of the means mounting or operating one brake assembly will affect the remaining brakes in the truck or even the truck at the other end of the vehicle.

Due to the absence of a plurality of levers and pull rods, etc., there are fewer connecting pins and pin bearings to wear, and this fact, coupled with the short direct travel of the cylinder pistons, reduces the amount of air required to operate the brakes.

The details of the structure as described and providing the above advantages may be varied substantially without departing from the spirit of the invention, and the exclusive use of those modifications coming within the scope of the claims is contemplated.

We claim:

1. Brake structure for railway truck wheeled axles with brake disks fixed thereon, comprising a pair of elongated cross beams with ends disposed to slidably engage suitable supports extending lengthwise of truck side frames, a rigid member extending between said beams and holding them in spaced relation transversely of their length, levers pivoted on said cross beams, fluid pressure cylinders mounted on said cross beams and provided with pistons operatively connected to said levers, and brake heads mounted on said levers and movable thereby toward the ends of said cross beams and disposed to engage brake disks on the truck axles.

2. Brake structure for railway truck wheeled axles with brake disks fixed thereon, comprising a pair of elongated cross beams each having spaced ends arranged to slidably engage suitable supports on side frames at opposite sides of a truck, struts extending between said beams and secured thereto and holding them in spaced relation, a pair of bell crank levers pivoted at their elbows on each of the beam at points spaced apart lengthwise of the beams, each bell crank lever having an arm extending from its pivot lengthwise of the cross beam toward the middle of the cross beam and having its other arm extending transversely of the beam and in a direction away from the beam, a brake shoe mounted on the outer end of the latter-mentioned arm, and individual fluid pressure cylinders mounted on the beam and having individual pistons and piston rod connections to the first-mentioned arms of the bell cranks.

3. Railway truck brake structure for wheeled axles with disk brakes, comprising elongated substantially parallel cross beams with end portions arranged for slidable mounting upon truck side frame shelves, struts between said beams holding them in spaced relation, a fluid pressure cylinder and piston, with projecting piston rod, secured to each beam between the middle of the beam and each end of the beam, a lever fulcrumed on each beam with an arm connected to the adjacent piston rod and with an arm extending from the beam and away from the other beam, brake shoes pivotally mounted on the outer ends of the latter-mentioned arms and each facing lengthwise of the beam and away from each other.

4. A unitary brake structure for a railway truck having spaced wheeled axles with brake disks fixed thereon and truck frame side members carried by the axles and holding them in spaced relation, comprising parallel cross beams spaced from each other and having ends slidably supported on the side frame members for movement lengthwise of the truck, strut structure connecting said cross beams and limiting their movement toward each other, levers pivoted on each cross beam each having an arm extending from the lever pivot transversely of the cross beam and an arm extending from its pivot lengthwise of the cross beam, and fluid pressure cylinders mounted on the cross beam and each having a piston operatively connected to an individual one of said levers.

5. A unitary brake structure for a railway truck having spaced wheeled axles with brake disks fixed thereon and truck frame, side members carried by the axles and holding them in spaced relation, comprising cross beams substantially paralleling the axles and spaced therefrom and from each other and having ends slidably supported on the side frame members for movement lengthwise of the truck, struts near opposite ends of the cross beams extending between the cross beams and pivotally connected thereto and holding them against substantial movement relative to each other lengthwise of the truck, a lever pivoted on the end portion of each cross beam with an arm extending transversely of the cross beam and an arm extending lengthwise of the cross beam, and fluid pressure cylinders mounted on the cross beam and having pistons operatively connected to individual ones of said levers.

6. In a railway truck having wheeled axles with brake disks and side frames and a load-carrying bolster extending between the side frames intermediate the axles, inboard shelves on the side frames at opposite sides of the bolster and inclined lengthwise of the side frames and upwardly toward the ends of the latter, a cross beam at each side of the bolster with terminals slidably supported on said shelves, struts near each side frame extending lengthwise of the truck beneath said bolster with connections at their opposite ends to the cross beams, a fluid pressure cylinder on each cross beam with pistons each having a rod projecting toward the adjacent end of the truck, levers fulcrumed on said cross beams with arms connected to said pistons and with other arms terminating adjacent to the axle brake disks, and brake shoes on the latter-mentioned arms opposing said disks, and common means for supplying fluid pressure to all of said cylinders.

7. In a railway truck having axles, brake disks, side frames, bolsters, shelves and brake gear according to claim 6 in which the strut connections to the cross beams include substantially upright pivots, and the lever fulcrums on the cross beam include substantially upright pivots, and the brake shoes carried on the lever arms have substantially upright pivotal connections thereto.

8. In a railway truck having axles, brake disks, side frames, bolsters, shelves and brake gear according to claim 6 in which stops are provided at the upper ends of the beam carrying shelves on the side frames and limit the advance movement of the respective cross beams.

9. In a railway truck having axles, brake disks, side frames, bolsters, shelves and brake gear according to claim 6 which includes a link pivotally connected at one end to each cross beam at a point on the latter spaced from the lever fulcrum thereon and extending from its pivot substantially parallel to the shoe carrying arm of the lever, and a link pivoted at its ends to the brake shoe and to the other end of said first-mentioned link, said links, lever and cross beam forming a quadrilateral holding the face of the brake shoe substantially parallel to the brake disc which it opposes.

10. In a railway truck, spaced wheeled axles with individual brake disks, side frames mounted on said axles, cross beams extending between the side frames adjacent to each axle and slidably mounted on the side frames, brake levers fulcrumed on said cross beams and having brake shoes adjacent said brake disks and movable thereby against said disks, fluid pressure cylinders and pistons mounted on said cross beams and operatively connected to said levers and with their axes disposed transversely of the cross beams, and connections between said cross beams and transmitting thrusts lengthwise of the truck directly between said cross beams and the brake levers and cylinder and pistons thereon.

11. The combination of a railway vehicle truck side frames and brake gear according to claim 10 in which the levers are bell cranks each having a fixed upright fulcrum on a cross beam, and each brake shoe is carried on the outer end of one arm of the bell crank to move lengthwise of the axles, and the fluid pressure cylinders and pistons are operatively connected to the other arms of the bell cranks to move transversely of the axles.

12. The combination of a railway vehicle truck side frames and brake gear according to claim 11 in which the brake shoes engage the upper portions of the brake disks and are frictionally urged lengthwise of the truck in the general direction of the other cross beam.

13. Railway vehicle truck and brake structure comprising spaced wheeled axles having individual brake disks fixed thereon, truck side frames supported on said axles, substantially parallel elongated cross beams spaced apart lengthwise of the truck and having end portions movably supported on said side frames, said cross beams being associated with respective wheeled axles, strut means between and connecting the two cross beams for holding them against relative movement lengthwise of the truck, said cross beams having top and bottom walls inclined to the horizontal transversely of their length, a lever fulcrumed on each cross beam to swing in the plane of inclination of the cross beam walls and having an arm provided with a brake shoe applicable to one of of said disks on a disk radius line normal to said plane, a power device mounted on each cross beam and movable in that plane and operatively secured to the lever fulcrumed on that beam.

References Cited in the file of this patent

UNITED STATES PATENTS

| | | |
|---|---|---|
| Re. 22,966 | Tack et al. | Jan. 20, 1948 |
| 2,347,387 | Aurien | Apr. 25, 1944 |
| 2,465,823 | Tack | Mar. 29, 1949 |
| 2,857,990 | Andrzejewski | Oct. 28, 1958 |
| 2,885,034 | Holin | May 5, 1959 |
| 2,903,097 | Busch | Sept. 8, 1959 |
| 2,955,679 | Herbert | Oct. 11, 1960 |
| 2,958,396 | Davis et al. | Nov. 1, 1960 |
| 2,958,397 | Newell | Nov. 1, 1960 |
| 2,958,398 | Newell | Nov. 1, 1960 |